United States Patent
Matsui et al.

(10) Patent No.: US 7,479,742 B2
(45) Date of Patent: Jan. 20, 2009

(54) DISCHARGE LAMP LIGHTING CIRCUIT

(75) Inventors: Kotaro Matsui, Shizuoka (JP);
Tomoyuki Ichikawa, Shizuoka (JP);
Soichi Yagi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 254 days.

(21) Appl. No.: 11/435,439

(22) Filed: May 16, 2006

(65) Prior Publication Data
US 2006/0261756 A1 Nov. 23, 2006

(30) Foreign Application Priority Data
May 17, 2005 (JP) .......................... P.2005-143953

(51) Int. Cl.
*G05F 1/00* (2006.01)
(52) U.S. Cl. .................. 315/291; 315/307; 315/289; 315/244; 315/224; 315/209 R; 315/DIG. 5; 315/DIG. 7
(58) Field of Classification Search ............. 315/209 R, 315/224, 244, 246, 276, 282, 289, 291, 307, 315/DIG. 5, DIG. 7
See application file for complete search history.

(56) References Cited

U.S. PATENT DOCUMENTS

| 5,121,034 | A * | 6/1992 | Allen et al. ................. 315/246 |
| 5,623,187 | A * | 4/1997 | Caldeira et al. ............. 315/307 |
| 6,522,089 | B1 * | 2/2003 | Duong et al. ................ 315/308 |
| 6,975,077 | B2 * | 12/2005 | Izumi et al. .............. 315/209 R |
| 7,023,143 | B2 * | 4/2006 | Harada et al. ............ 315/209 R |
| 7,291,990 | B2 * | 11/2007 | Ichikawa et al. ............. 315/291 |

FOREIGN PATENT DOCUMENTS

| JP | 7-142182 | 6/1995 |
| JP | 2003-297595 | 10/2003 |

* cited by examiner

*Primary Examiner*—Haissa Philogene
(74) *Attorney, Agent, or Firm*—Fish & Richardson P.C.

(57) ABSTRACT

A discharge lamp lighting circuit 1 includes a direct current-alternating current converting circuit 3, a starting circuit 4, controlling means 15 for controlling power, switching elements 5H, 5L driven by the controlling means 15 and a series LC resonance circuit (7p, 8, 9). A frequency modulating circuit is provided for restraining acoustic resonance by modulating a frequency of driving the switching element. When a basic frequency related to the drive frequency is equal to or higher than 1 MHz, a modulation width is set to be equal to or higher than 20 kHz.

11 Claims, 9 Drawing Sheets

DISCHARGE LAMP LIGHTING CIRCUIT

TECHNICAL FIELD

The present disclosure relates to addressing acoustic resonance in a high frequency lighting circuit of a discharge lamp.

BACKGROUND

A lighting circuit of a discharge lamp of a metal halide lamp or the like for an illuminating light source for an automobile, can include a direct current power source circuit having a constitution of a DC-DC converter, a direct current-alternating current converting circuit, and a starting circuit. For example, a direct current input voltage of a battery can be converted into a desired voltage in the direct current power source circuit, and then converted into an alternating current output by the direct current-alternating current converting circuit at a post-stage. The alternating current output is superposed with a starting signal that is supplied to the discharge lamp (see, for example, Japanese Patent Document JP-A-7-142182).

To light the discharge lamp, a no load output voltage (hereinafter, referred to as 'OCV') is controlled before lighting the discharge lamp (i.e., when lamp is turned off) and a starting signal is applied to the discharge lamp. The lamp is shifted to a steady state lighting state while reducing a transient input power.

For example, a switching regulator using a transformer can be used for the direct current power source circuit. As the direct current-alternating current converting circuit, a full bridge-type arrangement having pairs of switching elements or the like can be used.

One result of the arrangement for carrying out two-stage conversion (i.e., direct current voltage conversion and direct current-alternating current conversion) is that the circuit scale is enlarged, which is not suitable for small-sized formation. To obtain a reduced size, an output stepped up by one stage of voltage conversion in the direct current-alternating current converting circuit to the discharge lamp can be provided.

For example, one arrangement includes a series resonating circuit using a capacitor and an inductance element for supplying power to a discharge lamp after stepping up a resonant voltage by a transformer. The series resonance of the capacitor and the inductance element provides a frequency characteristic that is substantially symmetrical and centered on a resonance frequency. An output voltage or power can be controlled by changing a drive frequency of a semiconductor switching element forming a direct current-alternating current converting circuit. At a frequency region higher than the resonance frequency (inductive region or delay phase region), the output voltage tends to be reduced by increasing the frequency. At a frequency region lower than the resonance frequency (capacitive region or advance phase region), the output voltage tends to be reduced by reducing the frequency.

According to OCV control in turning off the lamp (before turning on the lamp) after inputting the power source, at a frequency region higher than a series resonance frequency (which is described as 'Foff'), an OCV value is increased by reducing the drive frequency of the semiconductor switching element. When the value reaches a target value, a starting high voltage pulse is generated and applied to the discharge lamp. When the discharge lamp is turned on, the discharge lamp shifts to a frequency region higher than the series resonance frequency (Fon>Foff) to start a control of power of the discharge lamp.

When a lighting frequency is increased by high frequency formation to reduce the size of the circuit apparatus for supplying a voltage in a shape of a rectangular wave or the like to light the discharge lamp, at a predetermined frequency or higher, resonance of vibration of a gas inside the discharge tube (sound wave) and a discharge arc pose a problem. A disturbance in a shape of the arc is initiated by a so-called 'acoustic resonance' phenomenon. The frequency of occurrence of the phenomenon is determined by a shape of the discharge tube and a pressure of the gas inside the discharge tube.

At a lighting frequency equal to or higher than 1 MHz, a frequency of occurrence of acoustic resonance is not continuous but discrete and, therefore, a stable arc is provided by setting the lighting frequency at a frequency which does not bring about acoustic resonance. Individual settings differ depending on the differences in the shape of the individual discharge tubes. A method of setting individually the lighting frequency for each discharge tube is not realistic in mass production formation.

It would be helpful to restrain acoustic resonance in lighting a discharge lamp at high frequency.

SUMMARY

An example implementation of the invention is described below. A discharge lamp lighting circuit includes a direct current-alternating current converting circuit for receiving a direct current input voltage and converting the direct current input voltage to an alternating current voltage. The circuit includes a starting circuit for supplying a starting signal to a discharge lamp, and controlling means for controlling power provided to the direct current-alternating current converting circuit. Various implementations can include one or more of the following features.

The direct current-alternating current converting circuit can include switching elements driven by the controlling means, and a series resonating circuit including a capacitor and at lease one of an inductance element or a transformer.

A frequency modulating circuit can restrain an acoustic resonance by modulating a frequency of driving the switching elements.

The disclosure also describes an operation to prevent a standing wave from occurring inside a discharge tube by an acoustic resonance frequency as a result of wavelengths of a wave traveling to a wall of the discharge tube and a wave reflected by the tube wall differing from each other.

Various implementations may include one or more the following advantages. For example, a stable discharge can be guaranteed by preventing a disturbance in the discharge arc by an acoustic resonance phenomenon. Further, it is not necessary to set the frequency individually for individual discharge tubes differing in shape. The modulating frequency can be determined uniformly regardless of the individual difference.

To prevent a power provided to the discharge lamp from being excessively low when the frequency is increased in accordance with the frequency modulation, a limiter circuit can be provided to prevent the drive frequency of the switching elements from exceeding Fmax, where Fmax is an upper limit frequency capable of maintaining the discharge lamp in a lit state.

Further, in order to enable to stable detection of a lamp voltage or a lamp current even in a region in which the frequency is less than the resonance frequency (Fon) during lighting, a limiter circuit can be provided for preventing the drive frequency of the switching elements from becoming less than a previously determined frequency lower limit value.

A triangular wave may be provided as an output waveform of the frequency modulating circuit so as to make it difficult to interrupt the discharge arc in comparison with a sine wave or the like.

Further, an advance influence is effected on starting performance of the discharge lamp by abruptly starting the frequency modulation immediately after staring the discharge lamp by the starting signal and therefore, it is preferable to start the frequency modulation after elapse of a predetermined time period after starting the discharge lamp.

The controlling means can include a voltage-frequency converting portion for outputting a signal of a frequency changed in accordance with an input voltage. Several modes of operation are available. First is a mode of frequency-modulating the output signal of the voltage-frequency converting portion by an output signal of the frequency modulating circuit and supplying the drive signal generated based on the frequency-modulated output signal of the voltage-frequency converting portion to the switching elements. Second is a mode of supplying the input voltage modulated by the output signal of the frequency modulating circuit to the voltage-frequency converting portion and supplying the drive signal generated based on the output signal of the voltage-frequency converting portion to the switching elements. Either of the modes is useful for simplifying the circuit arrangement. In the first mode, the frequency modulation can be realized by operating the frequency determined in accordance with the power provided to the discharge lamp. In the second mode, the frequency modulation can be realized by changing the target input power.

With regard to an allowable width related to the frequency modulation, a basic frequency related to a control of driving the switching elements can be designated as 'Fc,' and $\Delta$max is described as '$\Delta$max=2×(Fmax−Fc).' Preferably, Fc is equal to, or higher than, 1 MHz, and the modulation allowable width is equal to, or higher than, 20 kHz and equal to or lower than $\Delta$max. That is, the modulation frequency is set in view of a probability of bringing about sound resonation and a possibility of maintaining the lit state of the discharge lamp. For example, when applied to a vehicular lamp piece, the invention can promote reliability and safety.

DETAILED DESCRIPTION

Figure 1:
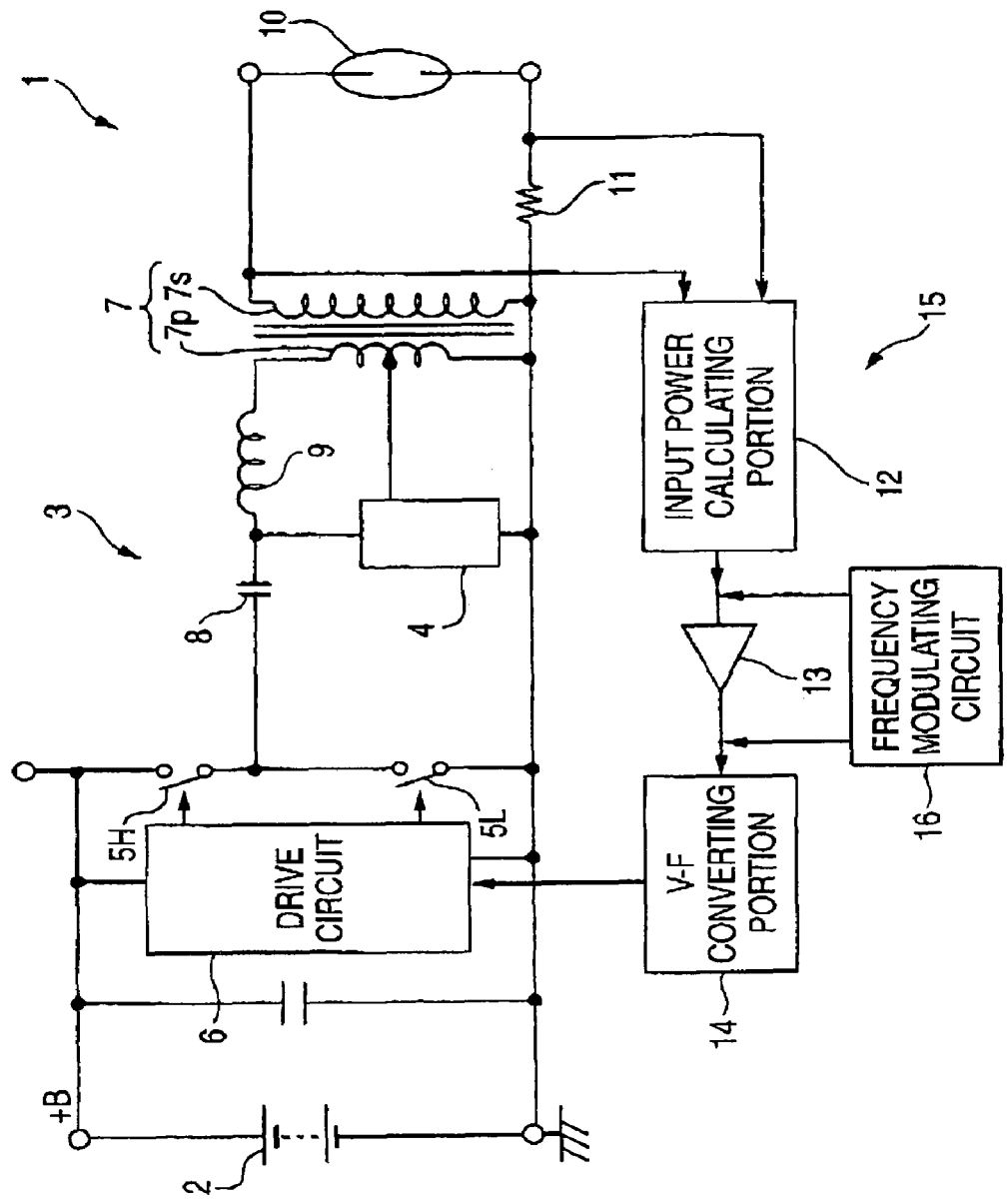
FIG. 1 is a diagram showing an example of a basic arrangement according to the invention.

FIG. 1 shows an example of a basic arrangement in which a discharge lamp lighting circuit 1 includes a direct current-alternating current converting circuit 3 for receiving power supply from a direct current power source 2.

The direct current-alternating current converting circuit 3 receives a direct current input voltage (refer to '+B' of the drawing) from the direct current power source 2 and converts the voltage into an alternating current voltage and stepping up the voltage. The circuit includes switching elements 5H, 5L and a drive circuit 6 for driving the switching elements. That is, one end of the switching element 5H on a high stage side is connected to a power source terminal, and the other end of the switching element is grounded by way of the switching element 5L on a low stage side. The respective elements 5H, 5L are alternately turned ON/OFF by signals from the drive circuit 6. Further, although the elements 5H, 5L are indicated by symbols for switches to simplify the drawing, a semiconductor switching element of a field effect transistor (FET), a bipolar transistor or the like can be used.

The direct current-alternating current converting circuit 3 includes a transformer 7 for transmitting power and stepping up voltage and, according to the illustrated example, on a primary side thereof, there is a circuit arrangement utilizing a resonance phenomenon of a capacitor 8 for resonance and an inductor or an inductance component. That is, for example, the following there modes are possible.

(I) A first mode utilizing resonance of the capacitor 8 for resonance and an inductance element (II) A second mode utilizing resonance of the capacitor 8 for resonance and leakage inductance of the transformer 7

(III) A third mode utilizing resonance of the capacitor 8 for resonance and an inductance element and leakage inductance of the transformer 7.

In the first mode (I), an inductance element 9 of a coil for resonance or the like is attached. For example, one end of the element is connected to the capacitor 8 for resonance, the capacitor 8 is connected to a connection point of the switching elements 5H and 5L. Further, the other end of the inductance element 9 can be connected to a primary winding 7p.

Further, in the second mode (II), it is not necessary to add a coil for resonance or the like by utilizing an inductance component of the transformer 7. That is, the one end of the capacitor 8 for resonance may be connected to the connection point of the switching elements 5H and 5L. The other end of the capacitor 8 may be connected to the primary winding 7p.

In the third mode (III), a series synthesized reactance of the inductance elements 9 and the leakage inductance can be used.

In any of the modes, a discharge lamp 10 (e.g., a metal halide lamp or the like used in a vehicular lamp piece) connected to a secondary winding 7s of the transformer 7 is lit by utilizing series resonance of the capacitor 8 for resonance and an inductive element (inductance component or inductance element) and turning the switching elements ON/OFF alternately by determining a drive frequency of the switching elements 5H, 5L to a value equal to or larger than the series resonance frequency. Further, in controlling to drive the respective switching elements, it is necessary to drive the respective elements alternately such that both of switching elements are not brought into an ON state (by controlling ON duty or the like). Further, with regard to the series resonance frequency, assuming the resonance frequency before lighting after providing a power source is designated as 'Foff,' a resonance frequency in a lighting state is designated as 'Fon,' an electrostatic capacitance of the capacitor 8 for resonance is designated as 'Cr,' an inductance of the inductance element 9 is designated as 'Lr,' and a primary side inductance of the transformer 7 is designated as 'Lp,', then in the third mode (III), before lighting the discharge lamp after providing the power source, the series resonance frequency becomes 'Foff=$1/(2\cdot\pi\cdot\sqrt{(Cr\cdot(Lr+Lp))})$.' For example, when the drive frequency is lower than Foff, loss of the switching elements is increased and an efficiency thereof is deteriorated. Therefore, the switching operation is carried out at a frequency region higher than Foff. Further, after lighting the discharge lamp, the series resonance frequency becomes 'Fon≈$1/(2\cdot\pi\cdot\sqrt{(Cr\cdot Lr)})$' (Foff<Fon). In this case, the switching operation is carried out at a frequency region higher than Fon.

After providing the power source of the lighting circuit, it is preferable to control OCV according to a value of a frequency near Foff in the state of turning off the discharge lamp (no load state) and to light the lamp at the frequency region higher than Fon when the lamp is shifted to the lighting state after generating the starting signal and starting the discharge lamp by the signal.

The starting circuit 4 applies the starting signal to the discharge lamp 10. An output voltage of the starting circuit 4 in starting is stepped up by the transformer 7 and applied to the discharge lamp 10 (the starting signal is superposed on an output converted into an alternating current output to be supplied to the discharge lamp 10). In the illustrated example, there is shown a mode of connecting one of the output terminals of the starting circuit 4 to a middle of the primary winding 7p and connecting another of the output terminals to one end (e.g., ground side terminal) of the primary winding 7p. With regard to input to the starting circuit 4, for example, various modes are possible, including a mode of providing an input voltage to the starting circuit from the secondary side of the transformer 7 or a starting auxiliary winding, and a mode of providing an auxiliary winding constituting the transformer along with the inductance element 9 and providing the input voltage to the starting circuit from the winding.

In a circuit mode, the power of the discharge lamp is controlled by converting a direct current input to an alternating current and a stepping up voltage is controlled by the direct current-alternating current converting circuit 3 as shown by FIG. 1. When a voltage applied on the discharge lamp 10 is detected, for example, the techniques can include dividing the output voltage of the transformer 7 or detecting the voltage through an additional winding for detecting or a terminal for detecting to the transformer 7.

When a current flowing in the discharge lamp 10 is detected, for example, the voltage can be converted by providing a resistor 11 for detecting the current on the secondary side of the transformer 7. Other techniques also may be used. For example, an auxiliary winding for forming the transformer, along with the inductance element 9 may be used. Te technique can include detecting a current thereof in correspondence with the current flowing in the discharge lamp 10.

The detecting signal or the voltage or the current related to the discharge lamp 10 is transmitted to an input power calculating portion 12, where the power to be provided to the discharge lamp 10 is calculated, and a control signal based on a result of the calculation is transmitted to a voltage-frequency converting portion (hereinafter, described as 'V-F converting portion') 14 by way of an error amplifier 13.

The V-F converting portion 14 generates a signal having a frequency that is changed in accordance with an input voltage thereof (pulse frequency modulating signal) and transmits the signal to the drive circuit 6. Thus, the drive frequency of the signal supplied from the drive circuit 6 to control terminals of the switching elements 5H, 5L is controlled.

Further, according to the example, controlling means 15 is includes the input power calculating portion 12, the error amplifier 13, the V-F converting portion 14, and the drive circuit 6.

A frequency modulating circuit 16 is provided for restraining acoustic resonance by modulating a frequency of driving the switching elements 5H, 5L. An output signal of the frequency modulating circuit 16 is transmitted to the V-F converting portion 14 or as the input to the error amplifier 13. That is, the following modes are available.

(A) A mode for modulating a frequency by operating a frequency in correspondence with a result of calculating the inputted power (B) A mode for varying the inputted power per se constituting a target of the control In either of the modes, the drive frequency of the switching element is changed with a predetermined width of variation as a result of modulating the frequency. That is, the frequency differs at each wave of an alternating wave and therefore, a wavelength of a driving wave going to a wall of the discharge tube and a wavelength of a wave reflected by the tube wall differ from each other. Therefore, when the discharge lamp is lit at or near an acoustic resonance frequency, a standing wave does not occur in the discharge tube and, therefore, the acoustic resonance phenomenon is restrained or does not occur.

Figure 2:
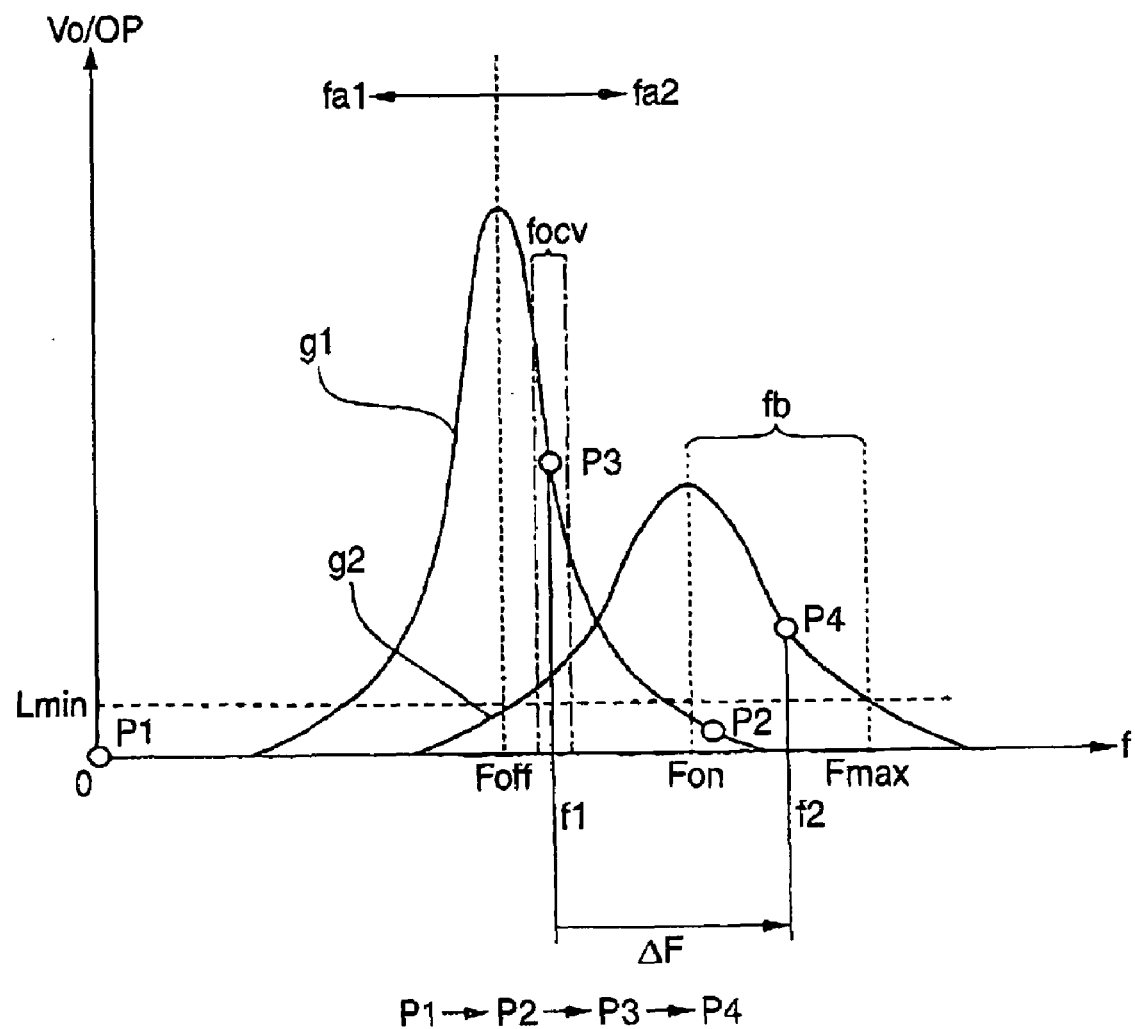
FIG. 2 is an outline graph diagram for explaining a frequency characteristic related to LC series resonance.

FIG. 2 is an outline graph diagram for explaining a frequency characteristic when LC series resonance is utilized, showing a resonance curve 'g1' when the discharge lamp is turned off and a resonance curve 'g2' when the discharge lamp is turned on by designating a frequency 'f' at the abscissa and designating an output voltage 'Vo' or an output power 'OP' at the ordinate.

Further, with regard to the resonance curve 'g1', the ordinate designates the output voltage 'Vo' and with regard to the resonance curve 'g2,' the ordinate designates the output power 'OP.'

When the discharge lamp is turned off, the secondary side of the transformer 7 is provided with a high impedance, an inductance value on the primary side of the transformer is high, and the resonance curve g1 having the resonance frequency Foff is provided. Further, when the discharge lamp is turned on, an impedance on the secondary side of the transformer 7 is low (e.g., several Ω through several hundreds Ω), the inductance value on the primary side is low, and the resonance curve g2 having the resonance frequency Fon is provided (in lighting, the amount of changing a voltage is comparatively small, and the current is mainly changed).

The meaning of various notations in the drawing is as follows.

'fa1'=a frequency region of 'f<Foff' (a capacitive region or an advanced phase region disposed on a left side of 'f=Foff')

'fa2'=a frequency region of 'f>Foff' (an inductive region or a delay phase region disposed on a right side of 'f=Foff')

'fb'=a frequency region disposed at 'f>Fon' (a frequency region in lighting which is disposed in the inductive region on the right side of 'f=Fon')

'$f_{OCV}$'=a range of controlling the output voltage before lighting the lamp (when the lamp is turned off) (hereinafter, the control range is referred to as an 'OCV control range' which is disposed at a region of the vicinity of Foff in fa2)

'Lmin'=an output level capable of maintaining to light the discharge lamp

'P1'=an operating point before inputting power source

'P2'=an initial operating point immediately after inputting power source (in region fb)

'P3'=an operating point indicating a time point of reaching a target value of OCV when the lamp is turned off (in $f_{OCV}$)

'P4'=an operating point after lighting (in region fb)

'f1'=a drive frequency of the switching element immediately after starting to light the discharge lamp (for example, a drive frequency at the operating point P3)

'f2'=a drive frequency of the switching element in lighting the discharge lamp (for example, a drive frequency at the operating point P4)

'Fmax'=a frequency at an intersection of g2 and Lmin (allowable upper limit frequency)

When a flow of a lighting shift control related to the discharge lamp is itemized, the items are, for example, as follows.

(1) The circuit power source is inputted (P1→P2)

(2) Power is inputted in the OCV control range $f_{OCV}$ (P2→P3)

(3) The starting pulse is generated and inputted to the discharge lamp (P3)

(4) After starting to light the discharge lamp, a value of a lighting freqluency (the drive frequency of the switching element) is fixed over a constant period of time (hereinafter, refer to as 'frequency fixing period') (P3)

(5) The lamp is shifted to a power control in fb (P3→P4).

Immediately after providing power source, or immediately after turning on the discharge lamp once and turning off the discharge lamp, the drive frequency is temporarily increased (P1→P2). Thereafter, the frequency is gradually reduced to about f1 (P2→P3).

OCV is controlled in $f_{OCV}$, the starting signal to the discharge lamp is generated, and the discharge lamp is turned on by applying the signal. For example, in the control of OCV, when the frequency is reduced to about the resonance frequency Foff from a high-frequency, the output voltage Vo is gradually increased to a target value at the operating point P3. Further, according to a method of controlling OCV at the region fa1 when the discharge lamp is turned off before being turned on, switching loss is considerably increased, and the circuit efficiency is deteriorated. Further, in the method of controlling OCV in the region fa2, caution is required such that the period of continuously operating the circuit in no load is no longer than necessary.

When the discharge lamp is started by the starting circuit 4 at the operating point P3, the drive frequency is a constant value during the period of fixing the frequency and, thereafter, the lamp is shifted to the region fb (refer to 'ΔF' of the drawing). Further, in shifting the frequency from the OCV control range $f_{OCV}$ to the region fb, it is preferable to change the frequency continuously from f1 to f2 after starting to turn on the discharge lamp.

As described above, when the discharge lamp is turned off, the output voltage is controlled at the region fa2 on the high frequency side of the resonance frequency Foff. When the discharge lamp is turned on, the power is controlled at the region fb on the high frequency side of the resonance frequency Fon (in the inductive region, the power can be stabilized by restraining a variation in the current) A control to reduce the drive frequency of the switching element is carried out.

Figure 3:
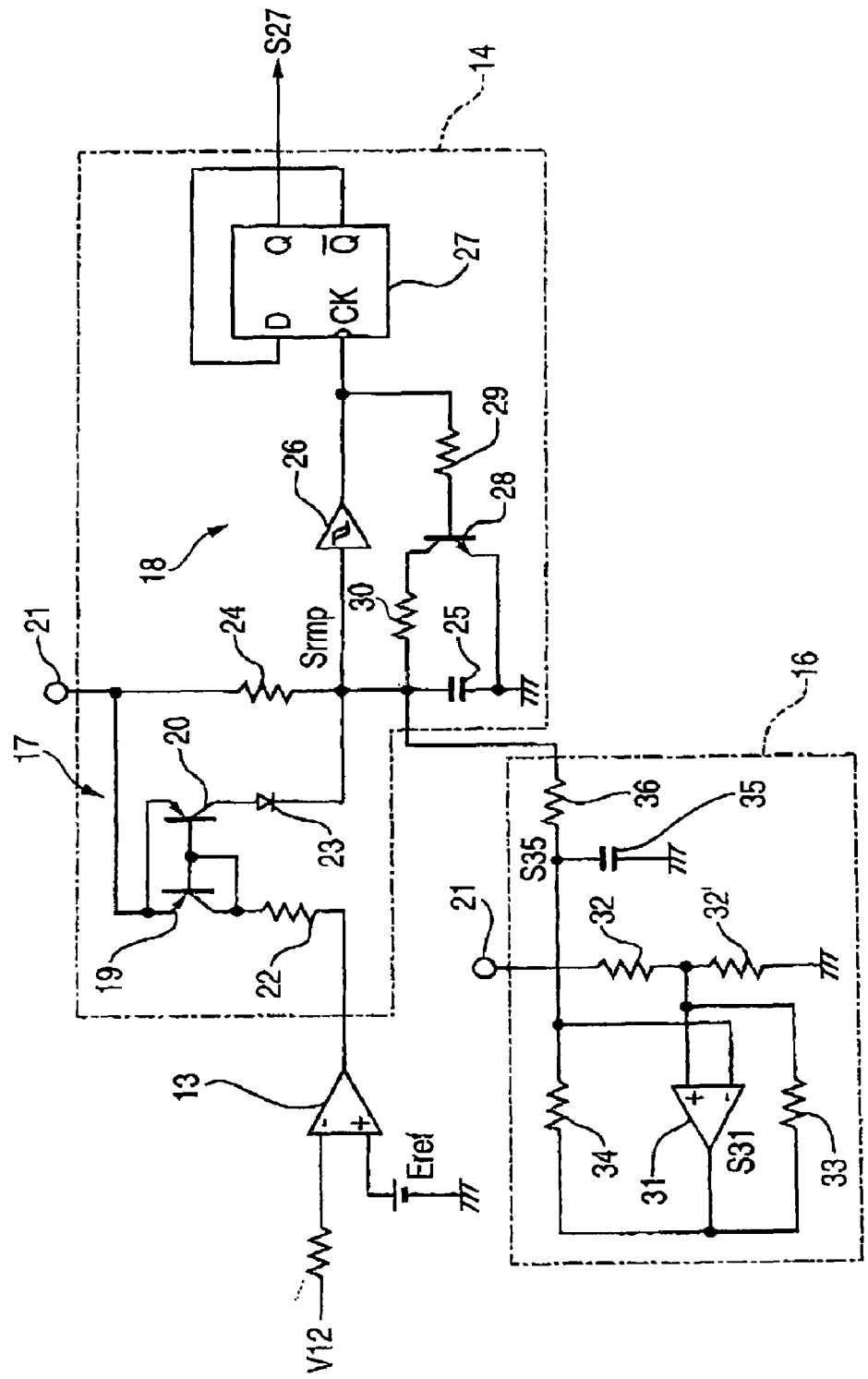
FIG. 3 is an example of a mode according to the invention.

FIG. 3 shows a portion of an example of a circuit arrangement according to mode (A).

In the error amplifier 13, a negative side input terminal is supplied with a control voltage (hereinafter, described as 'V12') from the input power calculating portion 12, and a positive side input terminal is supplied with a reference voltage 'Eref' (indicated by a sign of a constant voltage source in the drawing). Further, an output signal of the error amplifier 13 is transmitted to the V-F converting portion 14 at a poststage.

Although the input power calculating portion 12 is constructed by a circuit arrangement for controlling a transient input power after starting to turn on the discharge lamp and controlling power in a stable steady state, the input power calculating portion 12 may be constructed by any arrangement.

The V-F converting portion 14 includes a current source 17 using a current mirror and a ramp wave generating portion 18.

Emitters of the PNP transistors 19, 20 constituting the current mirror are connected to a power source terminal 21, and bases thereof are connected. Further, a collector of the transistor 19 is connected to the base of the transistor and is connected to the output terminal of the error amplifier 13 through a resistor 22.

A collector of the transistor 20 is connected to an anode of a diode 23, and a cathode of the diode is connected to a connection point of a resistor 24 and a capacitor 25.

One end of the resistor 24 is connected to the power source terminal 21, and the other end thereof is connected to the capacitor 25, which is grounded.

A terminal voltage of the capacitor 25 is supplied to a clock signal input terminal (CK) of a D flip flop 27 by way of a hysteresis comparator 26 and a base of a transistor 28.

The D flip flop 27 is constructed by a T (toggle) type arrangement by connecting a D terminal thereof to a Q bar terminal and a Q output signal is transmitted to the drive circuit 6.

The base of the transistor 28 is connected to an output terminal of the hysteresis comparator 26 through a resistor 29, and a collector thereof is connected to one end of the capacitor 25 through a resistor 30. Further, the emitter of the transistor 28 is grounded.

According to the example, the current is repeatedly fed back in accordance with the output of the error amplifier 13 through the transistor 19, 20. The capacitor 25 is charged by a potential change rate in accordance with the output and an operation of discharging the capacitor 25 by bringing the transistor 28 to an ON state when an output of the hysteresis comparator 26 indicates an H (high) level. Thereby, a ramp wave (PFM ramp wave) in accordance with the output of the error amplifier 13 is provided at the connection point of the resistor 24 and the capacitor 25. Further, the ramp wave constitutes a signal in a rectangular wave shape having a duty cycle of 50% from the hysteresis comparator 26 by way of the D flip flop 27.

The V-F converting portion 14 is provided with a control characteristic in which the higher the input voltage, the lower the frequency of the ramp wave. When the Q output of the D flip flop 27 is transmitted to the drive circuit 6 at the poststage, the output signal of the drive circuit 6 is transmitted respectively to control terminals of the switching elements 5H, 5L, and the respective elements are controlled to ON/OFF alternately with predetermined dead time. For example, in the frequency region higher than the resonance frequency (Fon) after turning off the discharge lamp, the larger the voltage value inputted to the V-F converting portion 14, the lower the frequency value. As a result, control is carried out in a direction of increasing the output voltage.

The frequency modulating circuit 16 can include an operational amplifier 31 with a comparator, a plurality of resistors and a single capacitor.

A noninverting terminal of the operational amplifier 31 is connected to a connection point of voltage dividing resistors 32 and 32', and one end of the resistor 32 is connected to the power source terminal 21. Further, the other end of the resistor 32 is grounded by way of the resistor 32'.

A resistor 33 is interposed between the noninverting input terminal and an output terminal of the operational amplifier 31. A resistor 34 is interposed between an inverting input terminal and the output terminal of the operational amplifier 31.

One end of a capacitor 35 is connected to the inverting input terminal of the operational amplifier 31, connected to one end (non-grounded side terminal) of the capacitor 25 by way of a resistor 36, and the other end of the capacitor 35 is grounded.

When the output signal of the operational amplifier 31 indicates H level, the capacitor 35 is charged and a terminal potential thereof is increased. Thereafter, when the terminal potential reaches an upper limit threshold potential, the output signal of the operational amplifier 31 indicates L (low) level, and the terminal potential of the capacitor 35 is reduced during the time period. Further, when the terminal potential reaches a lower limit threshold potential, a cycle in which the output signal of the operational amplifier 31 indicates H level is repeated.

Figure 4:
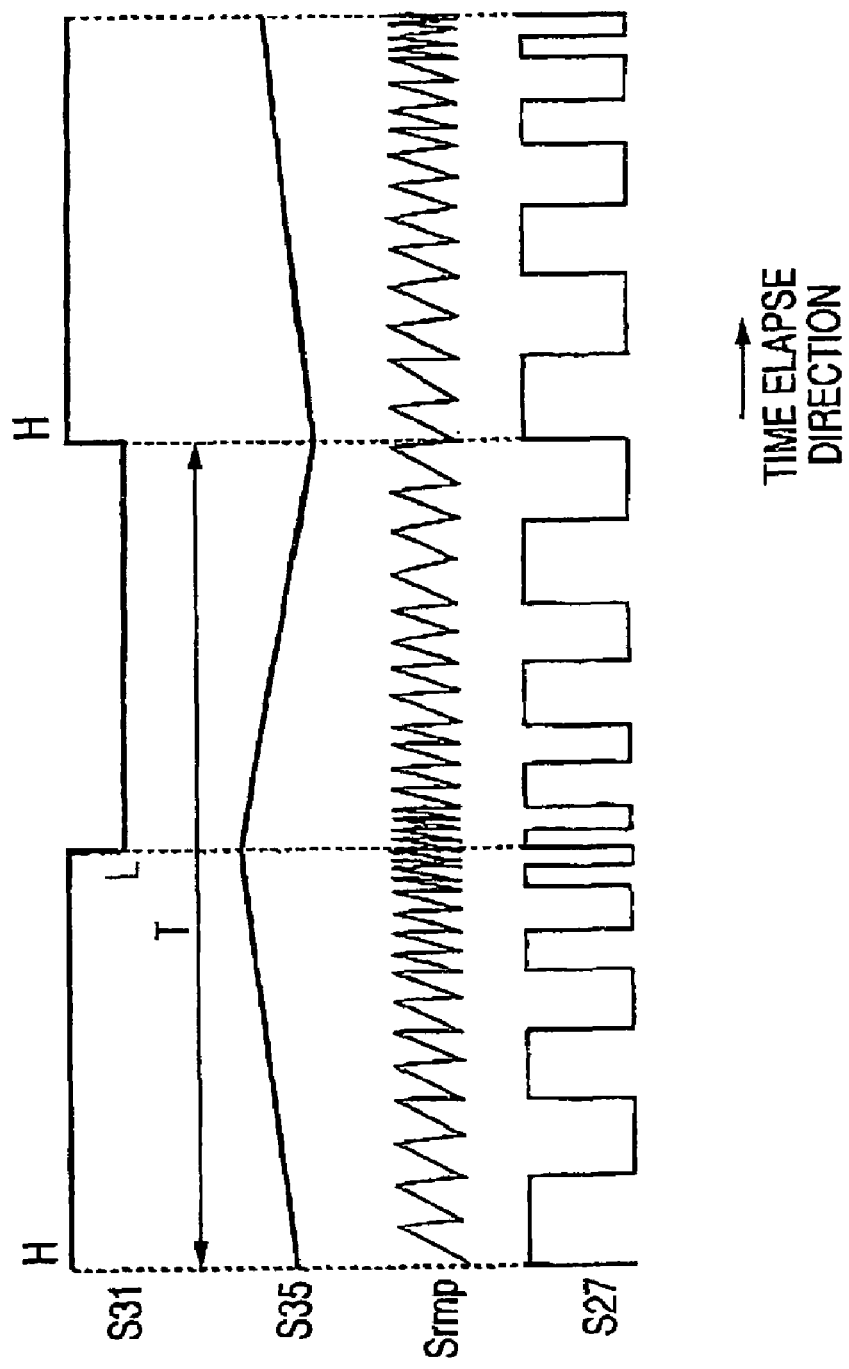
FIG. 4 is a waveform diagram for explaining circuit operation.

FIG. 4 is a diagram illustrating waveforms of respective portions of the circuit. The meaning of respective notations in the diagram is as follows.

'S31'=output signal of the operational amplifier 31 (indicating H level or L level)
'S35'=terminal potential of the capacitor 35
'Srmp'=potential at the point of connecting the resistor 24 and the capacitor 25 (PFM ramp wave)
'S27'=Q output signal of the D flip flop 27 (rectangular pulse signal)

The duration of period 'T' in the drawing indicates a period corresponding to a modulation frequency, S35 rises with a positive inclination during a time period in which S31 indicates H level, and S35 is lowered with a negative inclination during a time period in which S31 indicates L level. That is, S35 is a triangular wave changed by a predetermined frequency.

It is preferable, in view of the stability of the discharge arc, for an output waveform of the frequency modulating circuit 16 to have a triangular wave shape or substantially a triangular wave shape. That is, in a case of a waveform in which the duration of staying near a peak position or near a bottom position having a sine wave or a trapezoidal wave, a drawback of interrupting discharge arc or the like is liable to occur and, therefore, the discharge arc can be stabilized by adopting a substantially triangular wave having a short time period of staying near a peak position or near a bottom position.

Srmp is subjected to frequency modulation in accordance with a level of S35. That is, the higher the level of S35, the larger the slope of the ramp wave and, therefore, when the level of S35 is relatively lower than a center value thereof by constituting a reference thereby, a frequency of Srmp is low. However, when the level of S35 is relatively higher than the reference of the center value, the frequency of Srmp is high. In this way, as a result of frequency modulation with regard to the ramp wave, also with regard to S27, similarly, when the level of S35 is relatively lower (higher) by constituting the reference by the center value, a frequency thereof becomes low (high).

A charge current of the capacitor 25 is changed in accordance with the output of the error amplifier 13 to change the slope of the ramp wave Srmp to change the frequency. When a response time of the error amplifier 13 is set to be delayed relative to the modulation frequency of the ramp wave, frequency modulation can be realized by directly operating the charge current determining the frequency of the ramp wave.

Figure 5:
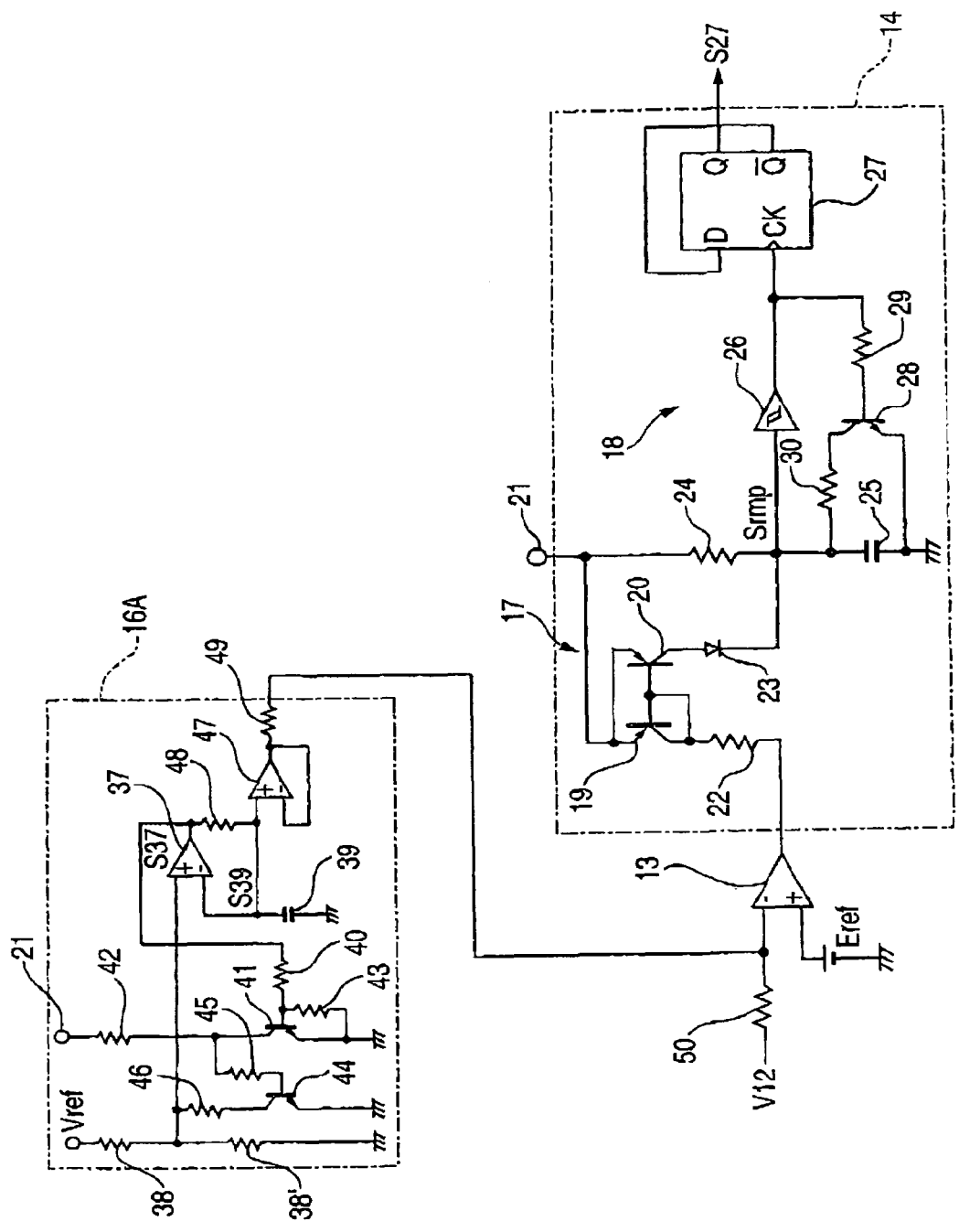
FIG. 5 illustrated another mode according to the invention.

FIG. 5 shows a portion of an example of a circuit arrangement according to mode (B).

A point of difference from the arrangement shown in FIG. 3 is that an output signal of the frequency modulating circuit 16A is supplied to a negative side input terminal of the error amplifier 13.

As described above, in the state of turning on the discharge lamp, frequency modulation with regard to the ramp wave can be realized by changing input power constituting a target upwards and downwards by utilizing the fact that power provided to the discharge lamp is determined in accordance with the drive frequency of the switching element According to the example, the frequency modulating circuit 16A includes an operational amplifier constituting a comparator and an operational amplifier having a voltage buffer, a plurality of resistors and a single comparator, and two NPN transistors.

A noninverting input terminal of an operational amplifier 37 is supplied with a voltage constituted by dividing a predetermined reference voltage 'Vref' by resistors 38 and 38.' The inverting input terminal of the operational amplifier 37 is grounded through capacitor 39.

An output terminal of the operational amplifier 37 is connected to the base of an NPN transistor 41 through resistor 40, and the collector of the transistor is connected to the power source terminal 21 through resistor 42. Further, the emitter of the transistor 41 is grounded, and a resistor 43 is interposed between the base and the emitter.

The base of an NPN transistor 44, whose emitter is grounded, is connected to the collector of the transistor 41 through resistor 45, and the collector of the transistor 44 is connected to the noninverting input terminal of the operational amplifier 37 through resistor 46.

A noninverting input terminal of an operational amplifier 47 at an output stage is connected to the output terminal of the operational amplifier 37 by way of a resistor 48, and is connected to one end (non-grounded side terminal) of the capacitor 39. An inverting input terminal is connected to an output terminal of the operational amplifier 47.

The output terminal of the operational amplifier 47 is connected to the negative input terminal of the error amplifier 13 by way of a resistor 49. Further, the negative type input terminal is supplied with an output V12 of the input power calculating portion 12 (not illustrated) and the output of the error amplifier 13 is transmitted to the V-F converting portion 14 as a control voltage (frequency control voltage) related to a frequency control of the switching elements (5H, 5L).

In the frequency modulating circuit 16A, when an output signal of the operational amplifier 37 indicates H level, a capacitor 39 is charged and a terminal potential thereof gradually rises. Further, in this case, the transistor 41 is brought into an ON state, the transistor 44 is brought into an OFF state, and a value Vref divided by the resistors is supplied to the noninverting input terminal of the operational amplifier 37.

When a terminal potential of the capacitor 39 rises and reaches an upper limit threshold potential, the output signal of the operational amplifier 37 is changed to L level. The terminal potential is gradually lowered by discharging the capacitor 39. In this case, the transistor 41 is brought into the OFF state, the transistor 44 is brought into the ON state, and a voltage level applied to the noninverting input terminal of the operational amplifier 37 becomes low.

Further, when the terminal potential of the capacitor 39 is lowered to reach a lower limit threshold potential, the output signal of the operational amplifier 37 indicates H level, and the capacitor 39 is started to be charged again. As a result of repeating the cycle, the terminal potential of the capacitor 39 is changed in a triangular wave shape.

Figure 6:
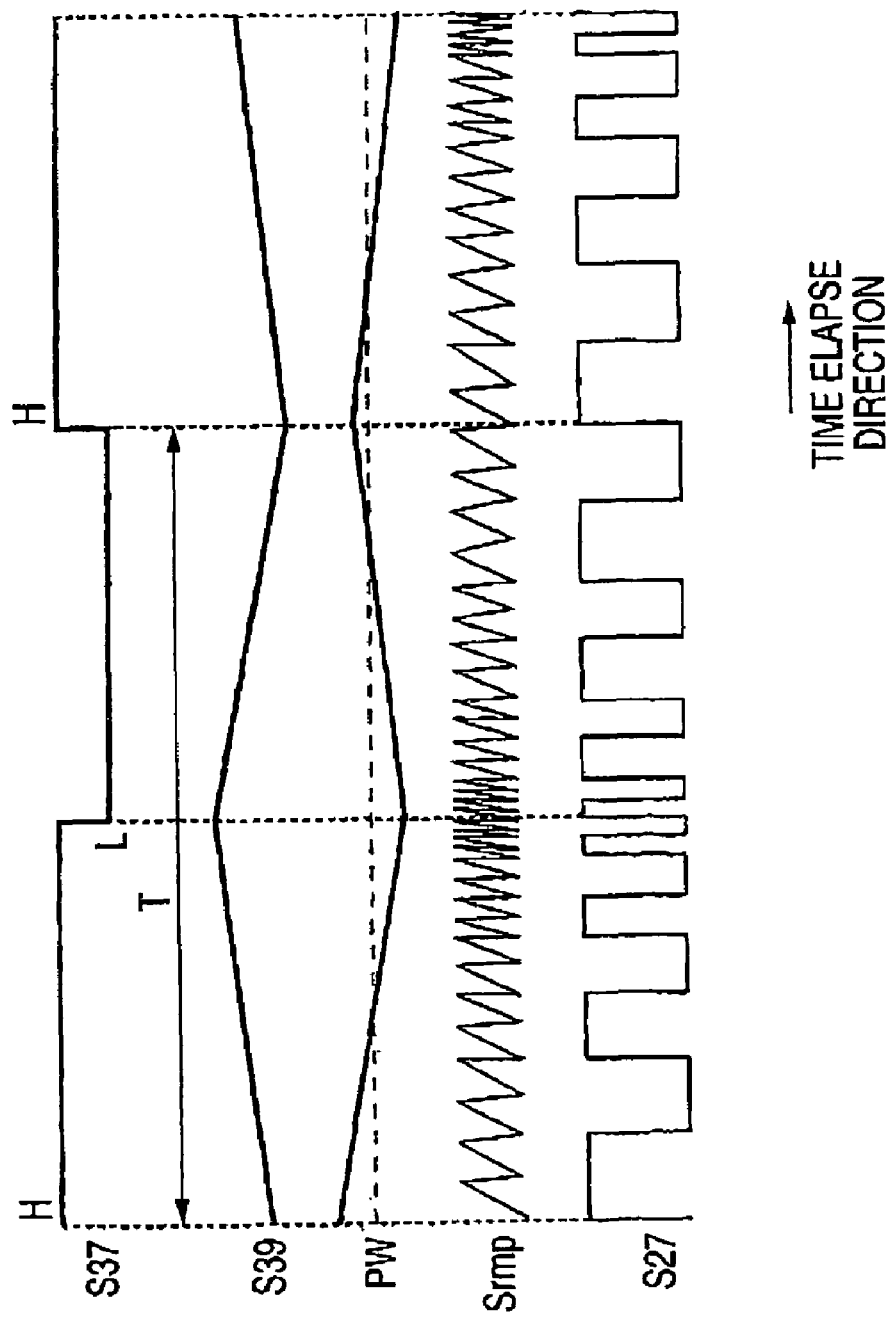
FIG. 6 is a wave form diagram for explaining circuit operation.

FIG. 6 is a diagram illustrating waveforms of respective portions of the circuit. The significance of respective notations in the diagram is as follows.

'S37'=output signal of the operational amplifier 37 (indicating H level or L level)
'S39'=terminal potential of the capacitor 39
'PW'=input power to the discharge lamp 10
S27 is as described above.

S39 rises with a positive slope during a time period in which S37 indicates H level and during the time period, PW is lowered. That is, in the state of turning on the discharge lamp, at the region (inductive region) on a high frequency side of the resonance frequency (Fon), when the output of the error amplifier 13 is lowered, and the output signal frequency of the V-F converting portion 14 is increased, power supplied to the discharged lamp is reduced.

Further, S39 is lowered to a negative slope during a time period in which S37 indicates L level and during the time period, PW rises. That is, in the region (inductive region) on the high frequency side of the resonance frequency (Fon) in the state of turning on the discharge lamp, the output of the error amplifier 13 is increased, and when the output signal frequency of the V-F converting portion 14 is lowered, the power supplied to the discharge lamp is increased.

In this way, PW is changed with a relationship of phase inverse to the phase of S39 by constituting a reference by an average value thereof.

Further, with regard to ramp wave Srmp, similar to the above-described, the higher the level of S39, the larger the slope of the ramp wave and, therefore, when the level of S39 is relatively lower than a center value thereof by constituting a reference thereof, the frequency of Srmp is low. However, when the level of S39 is relatively higher than the reference of the center value, the frequency of Srmp is high. As a result, also with regard to S27, similarly, when the level of S39 is relatively lower (higher) than a center value thereof by constituting a reference thereof, the frequency becomes low (high).

According to the example, frequency modulation can be achieved by setting a reaction of the error amplifier 13 faster relative to the modulation frequency of the ramp wave and varying the power value (upwards and downwards) by constituting a reference by a target value of power to be provided.

As explained above, a frequency of driving the switching element is varied by frequency modulation. For example, when the frequency becomes high, in the inductive region at Fon or higher, the power inputted to the discharge lamp is operated to be reduced. Therefore, when a width of a variation in the frequency is large and the drive frequency becomes higher than necessary, the power is not sufficiently supplied to the discharge lamp and there is a concern of turning off the lamp. Therefore, when an upper limit frequency capable of maintaining the state of turning on the discharge lamp is designated as 'Fmax,' it is preferable to provide means for preventing the frequency of driving the switching element from exceeding Fmax. That is, by determining an allowable upper limit to a variation in the frequency by the modulation, firm and stable discharge arc can be achieved.

Figure 7:
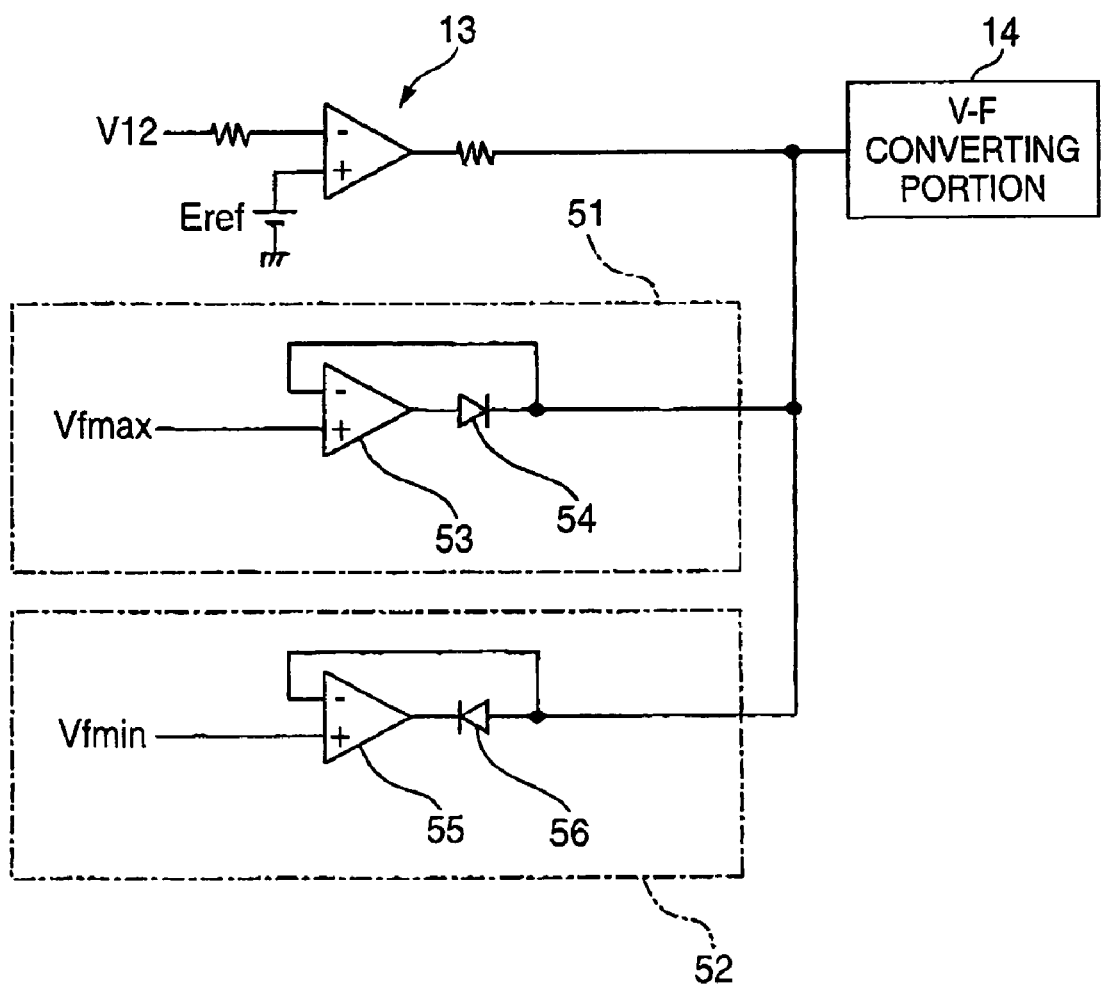
FIG. 7 is a diagram showing an example arrangement of attaching a frequency limiter circuit to a pre-stage of a V-F converting portion.

FIG. 7 shows a portion of an arrangement for attaching frequency limiter circuits 51, 52 at a pre-stage of the V-F converting portion 14 (excluding a frequency modulating circuit).

According to the example, a frequency upper limit value is determined by the limiter circuit 51, and a frequency lower limit value is determined by the limiter circuit 52.

The limiter circuit 51 is formed as a discharge buffer using an operational amplifier 53 and a non-inverting input terminal of the operational amplifier 53 is supplied with a set voltage value 'vfmax' for determining an upper limit of the frequency. An output terminal of the operational amplifier 53 is connected to an anode of a diode 54 and a cathode of the diode is connected to an inverting input terminal of the operational amplifier 53 and is connected to the input terminal of the V-F converting portion 14.

According to the example, the lower the input voltage of the V-F converting portion 14, the higher the frequency of the output signal and, therefore, the discharge buffer with the operational amplifier 53 is provided such that the input voltage of the V-F converting portion 14 is not equal to or lower than the lower limit value Vfmax.

Further, the limiter circuit 52 is formed as a charge buffer using an operational amplifier 55, and a non-inverting input terminal of the operational amplifier 55 is supplied with a set voltage value 'Vfmin' for determining a lower limit of the frequency. An output terminal of the operational amplifier 55 is connected to a cathode of a diode 56, an anode of the diode is connected to an inverting input terminal of the operational amplifier 55 and is connected to the input terminal of the V-F converting portion 14.

As a reason of providing the lower limit limiter of the frequency, it is pointed out to enable stable detection of the lamp voltage or the lamp current of the discharge lamp. For example, when the direct current input voltage to the lighting circuit becomes low, or when power exceeding a rated value is supplied to the discharge lamp in controlling transient power from swiftly starting light flux immediately after starting the discharge lamp, a load is heavy and a lamp may be controlled to be driven at a vicinity of the resonance frequency (Fon). In that situation, when the drive frequency of the switching element is varied in accordance with frequency modulation, the drive frequency is reciprocated between a state of entering a capacitive region lower than Fon and a state of entering inductive region higher than Fon. Particularly, in a state of entering deep into the capacitive region, as a result of disturbing the waveform of the lamp voltage or the lamp current, stability of feedback control is hampered. Hence, in order to be able to detect the lamp voltage or the lamp current reliably even in the capacitive region, according to the example, the charge buffer using the operational amplifier 55 is provided such that the input voltage of the V-F converting portion 14 does not exceed the upper limit value Vfmin.

The state of the discharge lamp is not stabilized immediately after starting the discharge lamp and, therefore, control for promoting starting performance can be performed by supplying maximum power allowable in the lighting circuit to the discharge lamp. Therefore, when the discharge lamp is started by applying the starting signal to the discharge lamp and the frequency modulation is started immediately after starting lighting, there is a concern of effecting an adverse influence on the starting performance of the lamp. That is, when power inputted to the discharge lamp is reduced in accordance with frequency modulation, sufficient power is not supplied to the discharge lamp to cause to bring about unstable formation of discharge arc.

Hence, it is preferable for promoting starting performance not to start the frequency modulation until a predetermined time period has elapsed (i.e., a time period to a degree of not effecting an influence on a change in light flux even when the acoustic resonance phenomenon is brought about, for example, about 1 second) from starting the discharge lamp, but to drive the switching element at or near the resonance frequency (Fon) and to start modulating the frequency of driving the switching element after the time period has elapsed.

Figure 8:
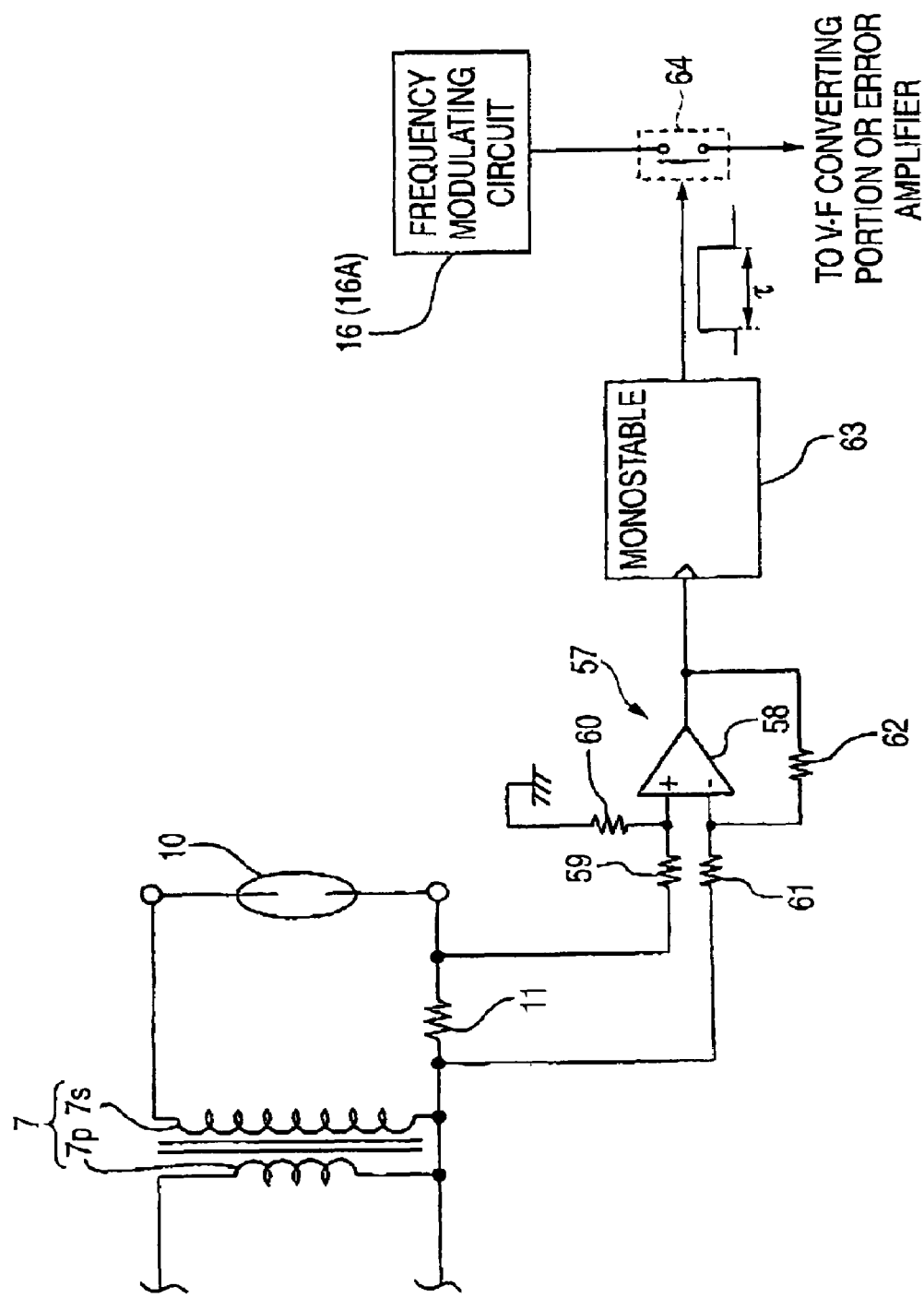
FIG. 8 is a diagram showing an example of a circuit arrangement when frequency modulation is prevented immediately after starting a discharge lamp.

FIG. 8 shows an example of a circuit arrangement.

A detecting signal, which is converted into a voltage by the current detecting resistor 11 related to the discharge lamp 10, is transmitted to a current detecting amplifier 57.

The current detecting amplifier 57 includes, for example, an operational amplifier 58, in which a non-inverting input terminal thereof is connected to one end (end connected to discharge lamp 10) of the current detecting resistor 11 by way of a resistor 59 and is grounded by way of the resistor 60. An inverting input terminal of the operational amplifier 58 is connected to the other end (ground side terminal) of the current detecting resistor 11 by way of a resistor 61, and a feedback resistor 62 is interposed between an output terminal and the inverting input terminal of the operational amplifier 58.

A post-stage of the current detecting amplifier 57 is provided with a monostable circuit 63, and an input terminal thereof is supplied with an output signal of the current detecting amplifier 57. For example, a signal constituting an onset by a time point of rise of the output signal and having a predetermined time width (which is designated as 'τ') is provided by the mono stable circuit 63 and the signal is utilized for control of switching the state of connecting the frequency modulating circuit.

Before starting the discharge lamp 10, the output of the current detecting amplifier 57 is at ground level. When the lamp current flows by starting lighting after starting the discharge lamp 10, the current detecting amplifier 57 provides a detecting level in accordance with an amplification factor thereof. A signal having the pulse width τ is generated from the monostable circuit 63 by constituting a trigger by a time point at which the lamp current starts to flow.

A semiconductor switch element 64 is arranged, for example, between the frequency modulating circuit 16 and the V-F converting portion 14, or between the frequency modulating circuit 16 and the error amplifier 13. The element is controlled to turn ON/OFF by the output signal of the monostable circuit 63. That is, during a period having a pulse width τ, the switch element 64 may be brought into the OFF state, the frequency modulating circuit and the V-F converting portion or the error amplifier may be separated, thereafter, the modulating operation may be started by the frequency modulating circuit by bringing the switch element 64 into the ON state.

With regard to an allowable width of frequency modulation, it has experimentally been found that when a lower limit value thereof is determined to be equal to or higher than 20 kHz in a case in which a basic frequency (which corresponds to the drive frequency at rated power and is described as 'Fc') related to driving of the switching element is equal to or higher than 1 MHz, the probability of bringing about acoustic resonance is less than 40%, and it has been found that in a case of the lower limit value equal to or higher than 30 kHz, the probability of bringing about acoustic resonance becomes zero or almost zero.

Figure 9:
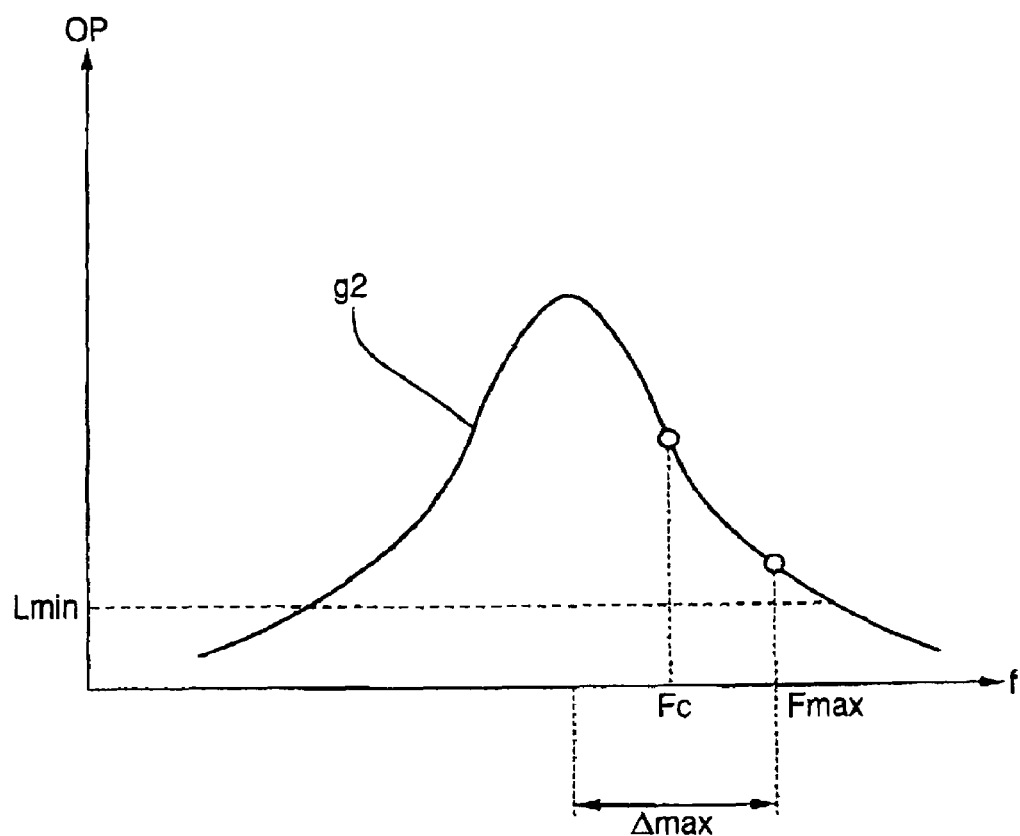
FIG. 9 is a graph diagram showing an outline of a frequency characteristic during lighting for explaining an allowable upper limit of frequency modulation.

Further, with regard to the upper limit value, as the power provided to the discharge lamp is reduced in accordance with the increase in the drive frequency in the inductive region on a high frequency side of (Fon), if twice the frequency difference between the upper limit frequency Fmax and Fc is designated as 'Δmax=2×(Fmax−Fc)' (refer to FIG. 9), it is preferable to determine a variation width to be equal to or smaller than Δmax (when Δmax is exceeded, the power inputted to the discharge lamp is deficient to pose a problem of increasing a probability of turning off the lamp or the like).

According to the foregoing arrangement, various advantages shown below may be achieved in some implementations.

The probability of bringing about acoustic resonance can sufficiently be reduced in lighting the discharge lamp by high frequency.

Unstable formation of discharge arc can be prevented by restricting the drive frequency of the switching element not to exceed the upper limit value.

Restricting such that the drive frequency of the switching element does not become lower than the lower limit value contributes to stable formation of the power control of the discharge lamp.

Frequency modulation using the triangular wave shape or substantially the triangular wave shape contributes to stable formation of discharge arc.

The starting performance of the discharge lamp can be guaranteed by starting frequency modulation after elapse of the predetermined time period in consideration of an allowance over time until stabilizing discharge arc without carrying out frequency modulation immediately after starting the discharge lamp.

In the mode (A) including the V-F converting portion 14 for outputting the signal of the frequency changed in accordance with the input voltage, it is advantageous for simplifying the circuit arrangement to generate the drive signal based on the output signal of the V-F converting portion 14 subjected to frequency modulation by the output signal of the frequency modulating circuit 16 and supply the drive signal to the switching elements (5H, 5L), further, the frequency lower limit for preventing the frequency of the drive signal from being less than the resonance frequency Fon can directly be set.

In the mode (B) including the V-F converting portion 14 for outputting the signal of the frequency changed in accordance with the input voltage, it is advantageous for simplifying the circuit constitution to supply the input voltage modulated by the output signal of the frequency modulating circuit 16A to the V-F converting portion 14, to generate the drive signal based on the output signal and to supply the drive signal to the switching elements (5H, 5L), further, the voltage value in consideration of preventing the discharge lamp from being turned off can directly be set.

High frequency lighting of the HID discharge tube used in the light source of the lamp piece for the automobile is realized, which is advantageous for small-sized formation, low cost formation or the like of the lighting circuit apparatus.

In high frequency lighting equal to or higher than 1 MHz, when the allowable width of frequency modulation is determined to be equal to or higher than 20 kHz, preferably, equal to or higher than 30 kHz and equal to or lower than Δmax, the probability of bringing about acoustic resonance can practically sufficiently be reduced.

What is claimed is:

1. A discharge lamp lighting circuit comprising:
   a direct current-alternating current converting circuit for receiving a direct current input voltage and converting the direct current input voltage to an alternating current voltage,
   a starting circuit for supplying a starting signal to a discharge lamp, and controlling means for controlling a power provided by the direct current-alternating current converting circuit;

wherein the direct current-alternating current converting circuit comprises switching elements driven by the controlling means and a series resonating circuit including a capacitor and at least one of an inductance element or a transformer, the direct current-alternating current converting circuit further including:

a frequency modulating circuit for restraining an acoustic resonance by modulating a frequency of driving the switching elements; and a limiter circuit for preventing the frequency of driving the switching elements from exceeding an upper limit frequency capable of maintaining a state of lighting the discharge lamp (Fmax).

2. The discharge lamp lighting circuit according to claim 1, configured so that a basic frequency (Fc) related to control of driving the switching elements is equal to or higher than 1 MHz, and an allowable width related to the frequency modulation is equal to or higher than 20 kHz and equal to or lower than Δmax, where Δmax=2×(Fmax−Fc).

3. The discharge lamp lighting circuit according to claim 1 further including:

a limiter circuit for preventing the frequency of driving the switching elements from being less than a frequency lower limit value.

4. The discharge lamp lighting circuit according to claim 1 wherein an output of the frequency modulating circuit has a shape of a triangular wave or substantially a shape of a triangular wave.

5. The discharge lamp lighting circuit according to claim 1 configured so that the frequency of driving the switching elements starts to be modulated after a predetermined time period elapses after starting the discharge lamp by the starting signal.

6. A discharge lamp lighting circuit comprising:

a direct current-alternating current converting circuit for receiving a direct current input voltage and converting the direct current input voltage to an alternating current voltage, a starting circuit for supplying a starting signal to a discharge lamp, and controlling means for controlling a power provided by the direct current-alternating current converting circuit;

wherein the direct current-alternating current converting circuit comprises switching elements driven by the controlling means and a series resonating circuit including a capacitor and at least one of an inductance element or a transformer, the direct current-alternating current converting circuit further including:

a frequency modulating circuit for restraining an acoustic resonance by modulating a frequency of driving the switching elements;

wherein the controlling means includes a voltage-frequency converting portion for outputting a signal of a frequency changed in accordance with an input voltage; and the controlling means is configured so that the output signal of the voltage-frequency converting portion is subjected to a frequency modulation by an output signal of the frequency modulating circuit, and a drive signal generated based on the frequency-modulated output signal of the voltage-frequency converting portion is supplied to the switching elements.

7. The discharge lamp lighting circuit according to claim 6 wherein an output of the frequency modulating circuit has a shape of a triangular wave or substantially a shape of a triangular wave.

8. The discharge lamp lighting circuit according to claim 6 configured so that the frequency of driving the switching elements starts to be modulated after a predetermined time period elapses after starting the discharge lamp by the starting signal.

9. A discharge lamp lighting circuit comprising:

a direct current-alternating current converting circuit for receiving a direct current input voltage and converting the direct current input voltage to an alternating current voltage, a starting circuit for supplying a starting signal to a discharge lamp, and controlling means for controlling a power provided by the direct current-alternating current converting circuit;

wherein the direct current-alternating current converting circuit comprises switching elements driven by the controlling means and a series resonating circuit including a capacitor and at least one of an inductance element or a transformer, the direct current-alternating current converting circuit further including:

a frequency modulating circuit for restraining an acoustic resonance by modulating a frequency of driving the switching elements;

wherein the controlling means includes a voltage-frequency converting portion for outputting a signal of a frequency changed in accordance with an input voltage; and the controlling means is configured so that the input voltage modulated by an output signal of the frequency modulating circuit is supplied to the voltage-frequency converting portion, and a drive signal generated based on the output signal of the voltage-frequency converting portion is supplied to the switching elements.

10. The discharge lamp lighting circuit according to claim 9 configured so that the frequency of driving the switching elements starts to be modulated after a predetermined time period elapses after starting the discharge lamp by the starting signal.

11. The discharge lamp lighting circuit according to claim 9 wherein an output of the frequency modulating circuit has a shape of a triangular wave or substantially a shape of a triangular wave.

* * * * *